US009484980B1

(12) United States Patent
Mitchell, Jr.

(10) Patent No.: US 9,484,980 B1
(45) Date of Patent: Nov. 1, 2016

(54) PRECISION TIMING SOURCE BACK-UP FOR LOSS OF GPS SATELLITES

(71) Applicant: Sprint Communications Company L.P., Overland Park, KS (US)

(72) Inventor: Eugene S. Mitchell, Jr., Blue Srings, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 87 days.

(21) Appl. No.: 13/692,472

(22) Filed: Dec. 3, 2012

(51) Int. Cl.
*H04B 1/7073* (2011.01)
*G04F 5/16* (2006.01)

(52) U.S. Cl.
CPC ............... *H04B 1/7073* (2013.01); *G04F 5/16* (2013.01)

(58) Field of Classification Search
CPC .......... G04F 5/16; G01S 19/24; G01S 19/39; H04B 7/2678; H04B 7/2125; H04B 1/7073
See application file for complete search history.

(56) References Cited

U.S. PATENT DOCUMENTS

| | | | |
|---|---|---|---|
| 4,170,776 A * | 10/1979 | Frosch et al. | 342/458 |
| 6,411,892 B1 * | 6/2002 | van Diggelen | 701/471 |
| 2002/0132631 A1 * | 9/2002 | Wesby et al. | 455/502 |
| 2002/0135511 A1 * | 9/2002 | Zhao et al. | 342/357.02 |
| 2003/0145202 A1 * | 7/2003 | Takahashi et al. | 713/168 |
| 2004/0189515 A1 * | 9/2004 | Vannucci | 342/357.01 |
| 2005/0242987 A1 * | 11/2005 | Umeno | 342/351 |
| 2007/0093226 A1 * | 4/2007 | Foltyn et al. | 455/265 |
| 2007/0201591 A1 * | 8/2007 | Knerr et al. | 375/365 |
| 2009/0018762 A1 * | 1/2009 | Sheikh | 701/200 |
| 2010/0124302 A1 * | 5/2010 | Martin | G06F 1/10 375/376 |
| 2010/0240968 A1 * | 9/2010 | Zeindler | 600/301 |
| 2011/0028158 A1 * | 2/2011 | Snapp | 455/456.1 |
| 2011/0275408 A1 * | 11/2011 | Kulik | 455/556.1 |
| 2013/0013199 A1 * | 1/2013 | You et al. | 701/513 |
| 2013/0292517 A1 * | 11/2013 | Briskman | 244/158.8 |

OTHER PUBLICATIONS

Peter J. Buist, Steven Engelen, Arash Noroozi, Prem Sundaramoorthy, Sandra Verhagen, and Chris Verhoeven, "Overview of Pulsar Navigation: Past, Present and Future Trends", Delft University of Technology, Journal of the Institute of Navigation, Apr. 2011.*

Josep Sala, Andreu Urruela, Xavier Villares, Jordi Romeu, Sebastipa Blanch,Robert Estalella, Josep M. Paredes, "Pulsar Navigation", Technical University of Catalonia, University of Barcelona, Jan. 2008.*

Nasa Historical Data Books (SP-4012), vol. VI, Chapter Four, Tracking and Data Acquisition/Space Operations, NASA History Division, 1999).*

Sheikh, Suneel I., Hanson, John E., Collins, John, Graven, Paul, "Deep Space Navigation Augmentation Using Variable Celestial X-Ray Sources," Proceedings of the 2009 International Technical Meeting of The Institute of Navigation, Anaheim, CA, Jan. 2009, pp. 34-48.*

* cited by examiner

*Primary Examiner* — Aristocratis Fotakis

(57) ABSTRACT

Methods are provided for implementing a timing synchronization or a backup timing synchronization in a telecommunication network. Timing pulses are received from a celestial body such as a star, pulsar, or quasar. The timing pulses are periodic and repetitive and act as a primary reference source in place of GPS timing or an atomic clock. The telecommunication network is synchronized from the timing pulses.

17 Claims, 5 Drawing Sheets

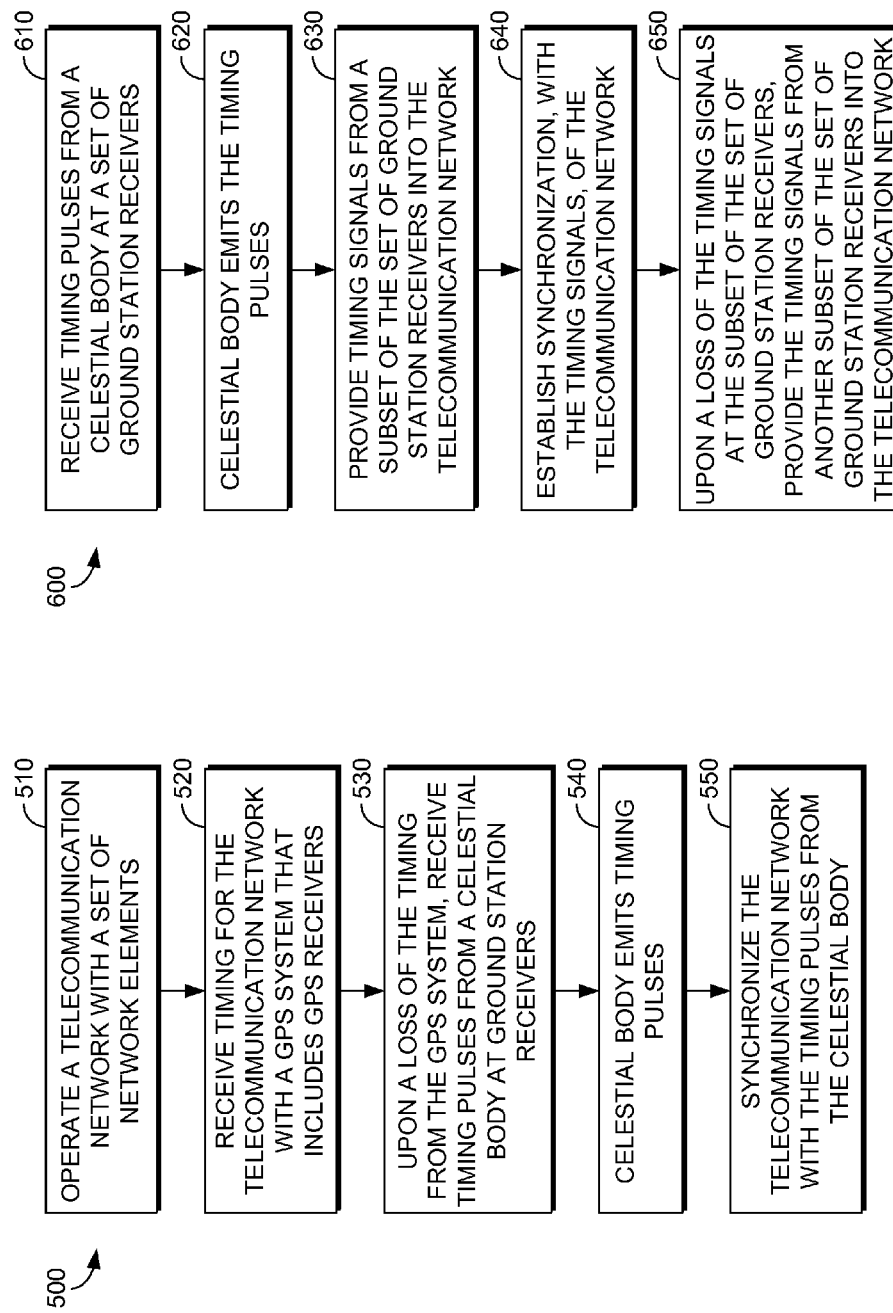

PRECISION TIMING SOURCE BACK-UP FOR LOSS OF GPS SATELLITES

CROSS-REFERENCE TO RELATED APPLICATIONS

Not applicable.

BACKGROUND OF THE INVENTION

Today nearly 100% of radio frequency (RF) networks depend on global positioning system (GPS) timing. Most network base transceiver stations (BTS) would become island cells if the GPS timing source is lost. A loss of timing sources means that a network would degrade within 24 to 72 hours. Therefore, an invention is needed that could provide a timing source in place of GPS timing. The invention should be flexible enough to replace atomic clocks as well.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a method for providing timing synchronization in a telecommunication network. Accordingly, the present invention receives timing pulses from a celestial body to provide timing to the telecommunication network. The timing pulses from the celestial body function as a primary reference source in place of a GPS system or atomic clock.

In a first aspect, a method for providing timing synchronization in a telecommunication network is provided that includes receiving timing pulses from a celestial body at a ground station receiver. The celestial body emits timing pulses. The timing pulses are used as a primary reference source to establish synchronization of the telecommunication network. Synchronization is established with timing signals for the telecommunication network. The timing signals are received in a synchronization supply unit. The synchronization supply unit provides a timing distribution to network elements in the telecommunication network.

In another aspect, a method for providing a backup timing synchronization in a telecommunication network is provided that includes operating a telecommunication network with a set of network elements. Timing is received for the telecommunication network with a GPS system that includes GPS receivers. Upon a loss of the timing from the GPS system, timing pulses are received from a celestial body at one or more ground station receivers. The celestial body emits the timing pulses. The telecommunication network is synchronized with the timing pulses from the celestial body.

In yet another aspect, a method for providing timing synchronization in a telecommunication network is provided that includes receiving timing pulses from a celestial body at a set of ground station receivers. The celestial body emits the timing pulses. Timing signals are provided from a subset of the set of ground station receivers into the telecommunication network. Synchronization of the telecommunication network is established with the timing signals, for the telecommunication network. Upon a loss of the timing signals at the subset of the set of ground station receivers, timing signals are provided from another subset of the set of ground station receivers into the telecommunication network.

BRIEF DESCRIPTION OF THE SEVERAL VIEWS OF THE DRAWINGS

Illustrative embodiments of the present invention are described in detail below with reference to the included drawing figures, wherein:

FIG. 5 is a process for implementing a backup timing synchronization in a telecommunication network in accordance with an embodiment of the present invention; and FIG. 6 is a process for implementing a another timing synchronization in a telecommunication network in accordance with an embodiment of the present invention.

DETAILED DESCRIPTION

Embodiments of the present invention relate generally to a method for providing timing synchronization in a telecommunication network. Accordingly, the present invention receives timing pulses from a celestial body to provide timing to the telecommunication network. The timing pulses from the celestial body function as a primary reference source in place of a GPS system and atomic clock.

Implementations of an embodiment of the present invention provide a timing source as accurate and perhaps more accurate and stable than an atomic clock (per the physics literature searches). This timing system is used as a back-up or even a primary timing source that is totally independent from any other timing source. Celestial bodies such as stars, pulsars and quasars are used for this alternative timing source. For example, a pulsar identified as PSR J0437-4715 is the closest millisecond pulsar (MSP) and the brightest known pulsar at this time. PSR J0437-4715 provides a constant precision string of 5.75 millisecond pulses that can be used as a backup or even a primary source of timing to network elements. A network of earth/space looking antennas can receive the pulses and synchronize timing in the network as needed. Logic circuits can use the pulses to establish nano- or even pico-timing sources for the network.

With an implementation of an embodiment of the present invention, a loss of GPS satellites will not result in a degradation of the network. There is less concern for a BTS becoming an isolated or island cell. When implementing an embodiment of the present invention, the earth/space looking antennas can be located in major markets and used according to policies and distances between markets. The earth/space looking antennas can also be located at an existing BTS as an alternative to GPS antennas. And even further, there is no need to update satellites several times a day, as found in GPS satellites. An implementation of an embodiment of the present invention does not require adjusting satellite timing tables to stay in synchronization with earth receivers.

Figure 1:
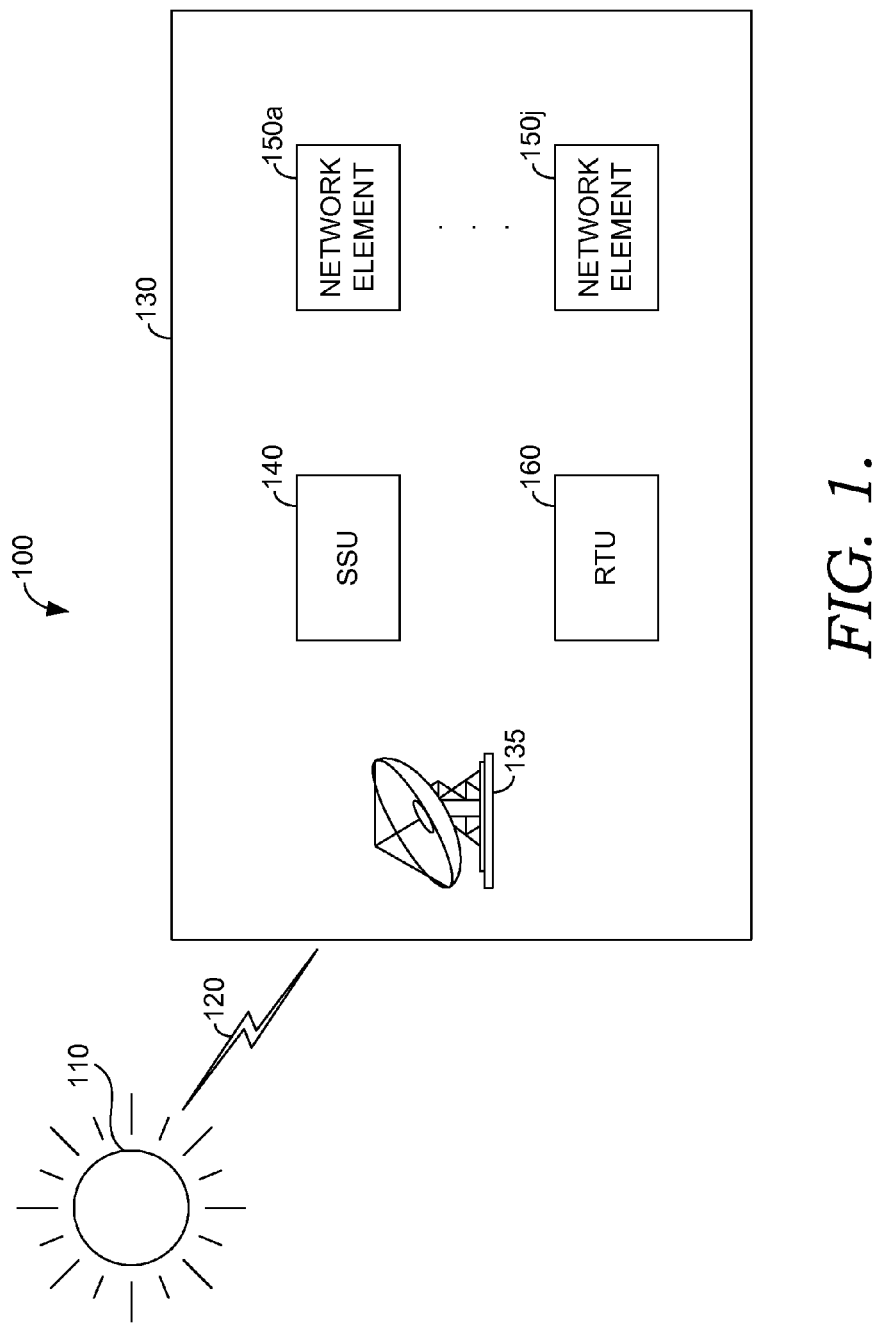
FIG. 1 is an exemplary view of a first network, implemented in accordance with an embodiment of the present invention.

In FIG. 1, an exemplary environment 100 is shown with a celestial body 100 emitting timing pulses 120 to a telecommunication network 130. Telecommunication network 130 is shown with a satellite receiver 135, synchronization supply unit (SSU) 140, network elements 150a-150j, and retiming unit (RTU) 160. Telecommunication network 130 includes exemplary elements that may vary from one network to another. The idea here is to indicate that elements may change depending on whether the telecommunication network is a wireless telecommunication network, plesiochronous (PDH) digital hierarchy network, Synchronous Optical Network (SONET), other type of telecommunication network, or some combination of the above. For example, network elements 150a-150j can represent elements such as base stations, base transceiver stations (BTS), radio network controllers (RNC), cell sites, and switching centers.

The various elements in telecommunication network 130 work together in a distributed architecture. For communication, these elements need to talk to each other in a systematic way. Timing and synchronization are critical for the functioning of telecommunication network 130. In FIG. 1, celestial body 110 emits pulses in a periodic and systematic fashion. The pulses are stable and reliable. Because of the periodic nature of the pulses, celestial body 110 can be relied on for timing purposes. In short, the pulses from celestial body are called timing pulses (120). The pulses are so accurate that the stability and periodic nature of the pulses rival timing received from GPS satellites and atomic clocks.

Timing pulses 120 travel through the galaxy and solar system, and can be detected by satellite receiver 135, which is located on earth. The time interval between pulses is what makes the use of celestial body 110 a reliable source for acting as a primary reference source. Timing pulses 120 are received at satellite receiver 135, which then uses the timing interval between pulses to establish timing synchronization with SSU 140. SSU 140 operates to provide timing distribution to network elements 150a-150j. In some embodiments, SSU 140 can provide timing distribution after receiving timing from satellite receiver 135. In other embodiments, SSU 140 works in conjunction with satellite receiver 135 to provide the timing distribution to the elements in telecommunication network 130.

In some instances, the timing from satellite receiver 135 to the other elements, such as SSU 140 or network elements 150a-150j, may be impacted by jitter and wander. Jitter and wander can impact the synchronization of a network. RTU 160 can be implemented to re-time the timing signal and to remove jitter and wander.

Figure 2:
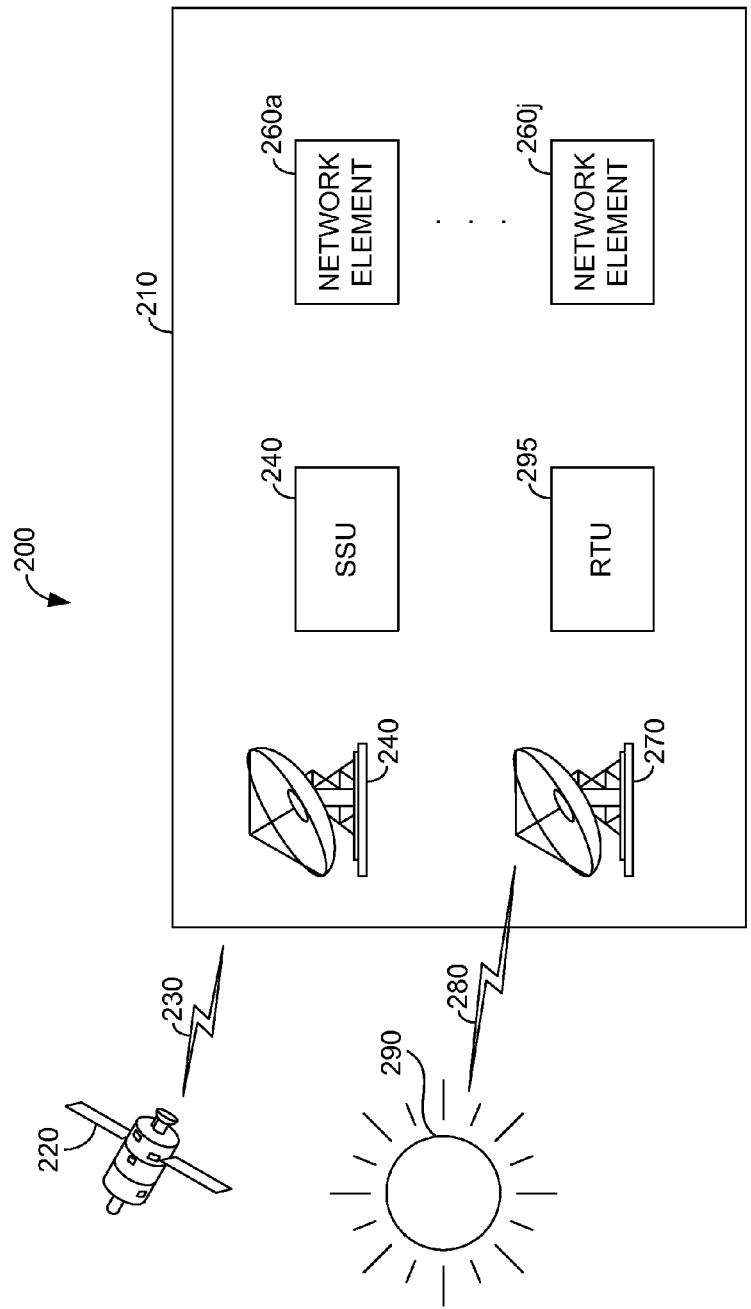
FIG. 2 is an exemplary view of a second network, implemented in accordance with an embodiment of the present invention.

Turning now to FIG. 2, an exemplary environment 200 is shown with a telecommunication network 210, GPS satellite 220, signal 230, timing pulses 280, and celestial body 290. Telecommunication network 210 includes a GPS receiver 240, an SSU 250, network elements 260a-260j, a satellite receiver 270, and an RTU 295. GPS satellite 220, signal 230, timing pulses 280, and celestial body 290 communicate with various elements within telecommunication network 210. GPS satellite 220 sends signal 230 to GPS receiver 240. Celestial body 290 sends timing pulses 280 to satellite receiver 270. As one can see, telecommunication network 210 is similar to telecommunication network 130 in FIG. 1. However, note that the elements shown in FIG. 2 are exemplary and that other elements and configurations can be implemented.

In an implementation of an embodiment of the present invention, GPS satellite 220, signal 230, and GPS receiver 240 are used to provide a primary timing signal and synchronization to telecommunication network 210. SSU 250 is similar to SSU 140. Network elements 260a-260j represent the same elements as network elements 150a-150j. RTU 295 is similar to RTU 160. As one of ordinary skill in the art knows, GPS satellites and GPS receivers can provide timing synchronization to networks. Although not shown, several GPS satellites and GPS receivers can be implemented to provide timing to a network, such as telecommunication network 210. For example, several GPS receivers, like GPS receiver 240, can receive signals, like signal 230, from GPS satellites to establish timing signals.

In an implementation of an embodiment of the present invention, the timing signal can be lost from the GPS satellites and GPS receivers, represented by GPS satellite 220, signal 230, and GPS receiver 240. When the timing signal is lost, a backup timing signal is provided through celestial body 290, timing pulses 280, and satellite receiver 270. The backup timing signal can be as accurate as the timing received from the GPS system. In addition, one could implement the timing signal from the celestial body as a primary reference source than as a backup source in FIG. 2. When the timing signal is received as timing pulses 280 at satellite receiver 270, the timing issues addressed by SSU 250 and RTU 295 are the same as the timing issues addressed by SSU 140 and RTU 160 in FIG. 1.

As shown in FIGS. 1 and 2, celestial body 110 and 290 provide the timing source to enable timing synchronization of telecommunication networks 130 and 210. The celestial body may be represented by a star, pulsar, quasar, or any celestial object that provides a repetitive pulse that is precise. The pulse may be a burst of light, radiation, or electromagnetic energy capable of being detected and received. Further, celestial body 110 or 290 should be positioned where satellite receiver 135 or 270 can receive the pulses. This reception may require the use of several satellite receivers positioned at designated locations to continuously receive the timing pulses. See FIG. 3 for more discussion on this topic.

Figure 3:
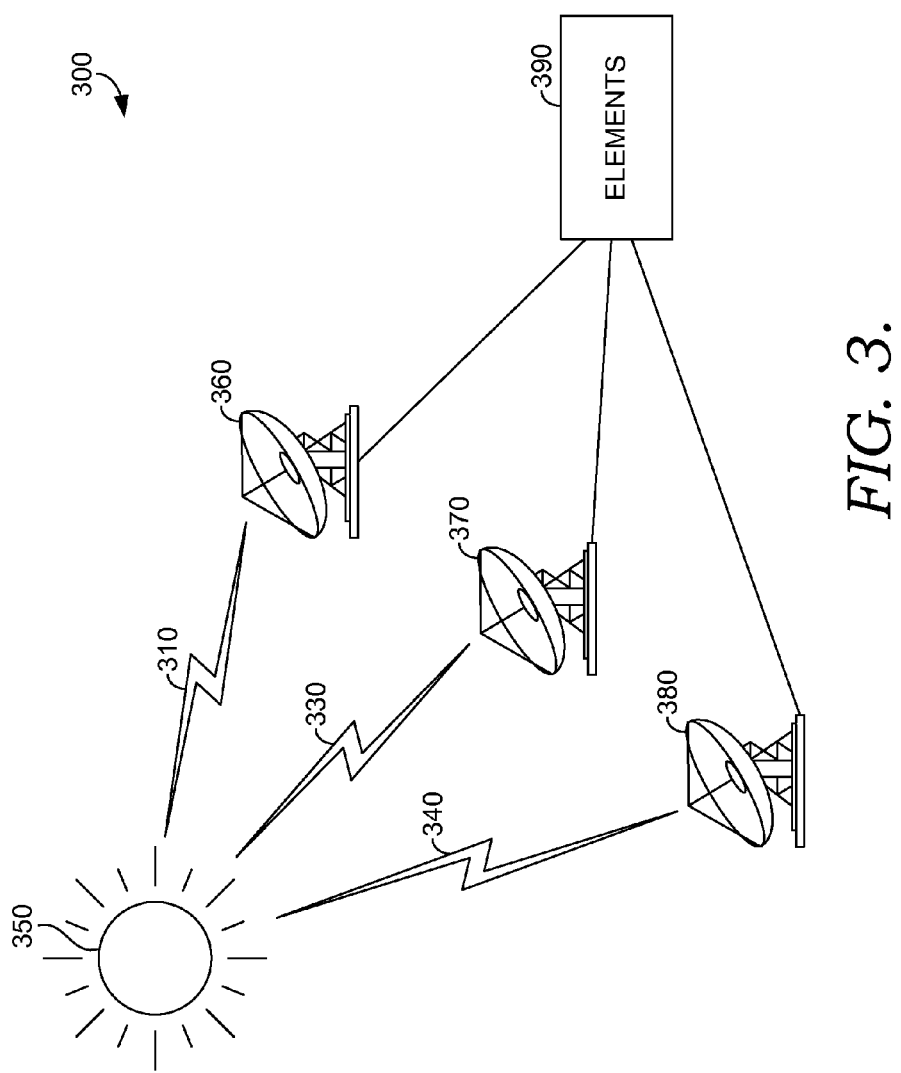
FIG. 3 is an exemplary view of a third network, implemented in accordance with an embodiment of the present invention.

In FIG. 3, an exemplary telecommunication network 300 is shown with timing pulses 310, 330, and 340, a celestial body 350, satellite receivers 360, 370, and 380, and elements 390. Telecommunication network 300 is an implementation of an embodiment of the present invention where the timing pulses 310, 330, and 340 are received in a continuous fashion despite any movement of celestial body 350 or rotation of the earth. Telecommunication network 300 illustrates how a timing signal may be received and implemented in a the network at elements 390. Elements 390 represents the various network elements and equipments found in a telecommunication network, which were discussed earlier for telecommunication networks 130 and 210.

Satellite receivers 360, 370, and 380 are representative of a configuration to capture timing pulses 310, 330, and 340, no matter where celestial body 350 is located. Satellite receivers 360, 370, and 380 may be distributed across the network in a way so that a signal is always received from celestial body 350. As one ordinary skill in the art understands, other implementations of the present invention may have more or less satellite receivers operational, depending on the need and the ability to receive the appropriate signal from celestial body 350. For example, celestial body 350 can emit repetitive, periodic timing pulses, but these pulses may not hit the earth at the same location all the time. As a result, satellite receivers can be placed at different locations to receive the timing pulses. If timing pulses 310 are lost, timing pulses 330 or 340 can still be received at satellite receiver 370 or 380, insuring a timing signal is always present.

In another embodiment of the present invention, satellite receivers 360, 370, and 380 may operate in a prioritized manner, where one receiver acts as the primary reception for the timing with the others functioning in a backup mode. So, when one satellite receiver loses reception of the timing pulses, another satellite receiver receives the timing pulses and provide timing to the telecommunication network. In a different embodiment, several satellite receivers can receive timing pulses as shown in FIG. 3 The multiple reception of timing pulses can be used to set the appropriate timing where jitter and wander is removed before timing synchronization occurs.

Figure 4:
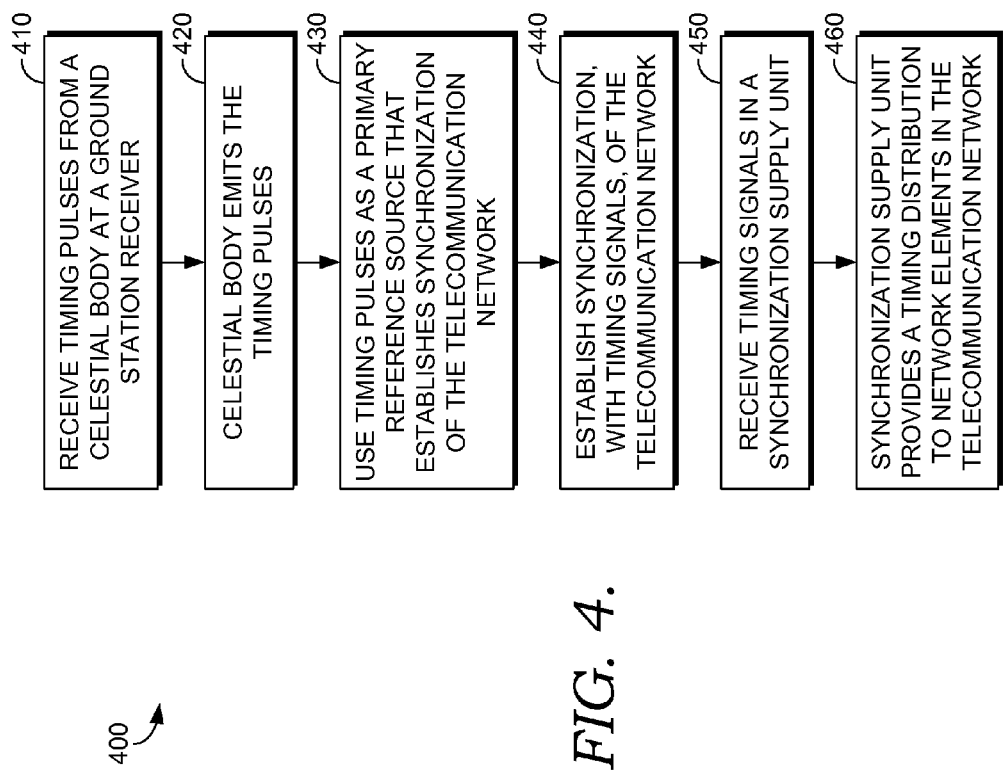
FIG. 4 is a process for implementing a timing synchronization in a telecommunication network in accordance with an embodiment of the present invention.

Turning now to FIG. 4, a process for providing timing synchronization in a telecommunication network is provided in a method 400. Timing pulses 120 are received from celestial body 110 at satellite receiver 135 in a step 410. In a step 420, celestial body 110 emits timing pulses 120 that can be received at earth. Timing pulses 120 are used as a primary reference source to establish synchronization of telecommunication network 130 in a step 430. In a step 440, synchronization is established, with timing signals, for telecommunication network 130. In steps 450 and 460, timing signals are received in SSU 140 so that timing may be distributed to various network elements 150a-150j in telecommunication network 130.

In FIG. 5, a process for providing a backup timing synchronization in a telecommunication network is provided in a method 500. In a step 510, telecommunication network 210 operates with network elements 260a-260j, SSU 250, and RTU 295. Timing for telecommunication network 210 is received with a GPS system that includes GPS satellite 220, signal 230, and GPS receiver 240, in a step 520. In a step 530, when timing is lost at GPS satellite 220, signal 230, and GPS receiver 240, timing pulses 280 are received from celestial body 290 at satellite receiver 270. In steps 540 and 550, celestial body 290 emits timing pulses 280 that are used to synchronize telecommunication network 210.

Turning now to FIG. 6, a process for providing timing synchronization in another telecommunication network is provided in a method 600. In a step 610, timing pulses 310, 330, and 340 are received from celestial body 380 at satellite receivers 360, 370, and 380. Celestial body 380 emits timing pulses in a step 620. In a step 630, timing signals are provided from a subset of satellite receivers 360, 370, and 380 into telecommunication network 300. If one of the satellite receivers is incapable of receiving timing pulses, another satellite receiver can receive the timing pulses and maintain synchronization in telecommunication network 300, in a step 650. In a step 640, synchronization is established, with the timing signals, for telecommunication network 640.

Although a selection of embodiments have been described for the present invention, there are many other potential applications for advanced timing networks that can be implemented with the present invention. For example, differential timing for aircraft precision landing and navigational guidance can be implemented with the present invention. Precision plowing of a farmer's field can be accomplished. Military applications can be implemented or deployed. The idea here is to state that celestial bodies provide a stable timing source that rival GPS systems and atomic clocks. This stable timing source can be implemented across many technologies.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for providing timing synchronization in a telecommunication network, comprising:
   encountering a complete loss of a global positioning system (GPS) signal;
   receiving timing pulses from a pulsar at a plurality of ground station receivers positioned at different locations such that, when the pulsar emits the timing pulses, the plurality of ground station receivers is positioned to continuously receive the timing pulses from the pulsar at least at one of the plurality of ground station receivers, wherein one of the plurality of ground station receivers capable of receiving the timing pulses functions as a primary receiver of the timing pulses, and wherein the remaining ground station receivers function as backup receivers of the timing pulses;
   using the timing pulses as a primary reference source that establishes synchronization of the telecommunication network and provides timing signals for the telecommunication network;
   establishing synchronization with the timing signals for the telecommunication network during the complete loss of the GPS signal; and
   receiving the timing signals in a synchronization supply unit, wherein the synchronization supply unit of the primary receiver of the timing pulses provides a timing distribution to one or more network elements in the telecommunication network, and wherein the synchronization supply units of the backup receivers of the timing pulses receive the timing distribution from the synchronization supply unit of the primary receiver.

2. The method of claim 1, wherein a timing pulse is radiation emitted by the pulsar.

3. The method of claim 2, wherein the ground station receiver is a satellite earth station.

4. The method of claim 3, further comprising operating a retiming unit that removes jitter and wander from the timing signals.

5. The method of claim 4, wherein establishing synchronization of the telecommunication network comprises synchronizing the telecommunication network using wireless technology or timing signals such as Inter-range instrumentation group time codes (RIG), WWV, WWVH, and Deutschland Long Wave Signal Frankfurt 77.5 kHz (DCF77).

6. A method for providing a backup timing synchronization in a telecommunication network, comprising:
   operating a telecommunication network with a set of network elements;
   receiving timing for the telecommunication network with a global positioning system (GPS) system that includes one or more GPS receivers;
   upon a complete loss of the timing from the GPS system, receiving timing pulses from pulsar at a plurality of ground station receivers positioned at different locations such that, when the pulsar emits the timing pulses, the plurality of ground station receivers is positioned to continuously receive the timing pulses from the pulsar at least at one of the plurality of ground station receivers, wherein one of the plurality of ground station receivers capable of receiving the timing pulses functions as a primary receiver of the timing pulses, and wherein the remaining ground station receivers function as backup receivers of the timing pulses; and synchronizing the telecommunication network with the timing pulses received from the pulsar at the primary receiver of the timing pulses during the complete loss of the timing from the GPS system.

7. The method of claim 6, wherein a timing pulse is radiation emitted by the pulsar.

8. The method of claim 7, wherein the ground station receiver is a satellite earth station.

9. The method of claim 8, further comprising operating a retiming unit that removes jitter and wander from timing signals.

10. The method of claim 9, wherein synchronizing the telecommunication network comprises synchronizing the telecommunication network using wireless technology or timing signals such as Inter-range instrumentation group time codes (TRIG), WWV, WWVH, and Deutschland Long Wave Signal Frankfurt 77.5 kHz (DCF77).

11. A method for providing timing synchronization in a telecommunication network, comprising:

encountering a complete loss of a global positioning system (GPS) signal;

receiving timing pulses from a pulsar at a plurality of ground station receivers positioned at different locations such that, when the pulsar emits the timing pulses, the plurality of ground station receivers is positioned to continuously receive the timing pulses from the pulsar at least at one of the plurality of ground station receiver, wherein the subset of the plurality of ground station receivers capable of receiving the timing pulses function as primary receivers of the timing pulses, and wherein the subset of ground station receivers not capable of receiving the timing pulses function as backup receivers of the timing pulses;

providing one or more timing signals from a subset of the set of ground station receivers into the telecommunication network during the complete loss of the GPS signal;

establishing synchronization, with the one or more timing signals, for the telecommunication network; and upon a loss of the one or more timing signals at the subset of the plurality of ground station receivers functioning as primary receivers of the timing pulses, providing the one or more timing signals from the subset of the plurality of ground station receivers functioning in backup receivers of the timing pulses into the telecommunication network.

12. The method of claim 11, further comprising receiving the one or more timing signals in one or more synchronization supply units, wherein the one or more synchronization supply units provide timing distribution to network elements in the telecommunication network.

13. The method of claim 11, wherein a timing pulse is radiation emitted by the pulsar.

14. The method of claim 13, wherein the pulsar is selected from a group including a star, pulsar, and quasar.

15. The method of claim 14, wherein the ground station receiver is a satellite earth station.

16. The method of claim 15, further comprising operating one or more retiming units that remove jitter and wander from the one or more timing signals.

17. The method of claim 16, wherein the one or more timing signals are transmitted in a format such as Inter-range instrumentation group time codes (IRIG), WWV, WWVH, Deutschland Long Wave Signal Frankfurt 77.5 kHz (DCF77).

* * * * *